United States Patent [19]

Matsumoto et al.

[11] Patent Number: 5,518,844
[45] Date of Patent: May 21, 1996

[54] METHOD OF PROCESSING A PHOTOSENSITIVE MATERIAL AND PHOTOSENSITIVE MATERIAL PROCESSOR

[75] Inventors: Nobuo Matsumoto; Toshihiro Nishikawa, both of Kanagawa, Japan

[73] Assignee: Fuji Photo Film Co., Ltd., Kanagawa, Japan

[21] Appl. No.: 318,338

[22] Filed: Oct. 5, 1994

[30] Foreign Application Priority Data

Nov. 15, 1993 [JP] Japan .................................. 5-285249

[51] Int. Cl.⁶ ............................. G03C 7/00; G03D 3/00
[52] U.S. Cl. ........................ 430/30; 430/401; 430/494; 430/140; 430/501; 430/496; 430/347; 430/644; 354/21; 354/75; 354/76; 354/105; 354/298; 354/331
[58] Field of Search ................................ 354/21, 75, 76, 354/105, 298, 331; 430/401, 494, 140, 501, 496, 347, 644, 30

[56] References Cited

U.S. PATENT DOCUMENTS

| | | | |
|---|---|---|---|
| 5,101,225 | 3/1992 | Wash et al. | 430/501 |
| 5,187,518 | 2/1993 | Kitagawa | 354/105 |
| 5,344,730 | 9/1994 | Kitamoto | 430/140 |
| 5,382,508 | 1/1995 | Ikenoue | 354/105 |

*Primary Examiner*—Mark F. Huff
*Attorney, Agent, or Firm*—Sughrue, Mion, Zinn, Macpeak & Seas

[57] ABSTRACT

In a first processing step, whether a first photosensitive material is a particular photosensitive material is detected. If it is detected at least that the first photosensitive material is the particular photosensitive material, processing conditions in the first processing step are recorded in a predetermined position on the first photosensitive material. Exposure conditions in the exposure step are set in accordance with one of the result of the detection and the processing conditions recorded on the first photosensitive material. The second photosensitive material is exposed under the set exposure conditions. If the first photosensitive material is detected to be a particular photosensitive material, the setting of the exposure conditions is changed in the exposure step, and the exposure conditions are set in such a manner as to compensate the difference in the characteristic occurring in the image of the particular first photosensitive material depending on standard processing and particular processing. Accordingly, even in the case of a photosensitive material requiring particular processing, it is possible to form an image of fixed quality.

5 Claims, 11 Drawing Sheets

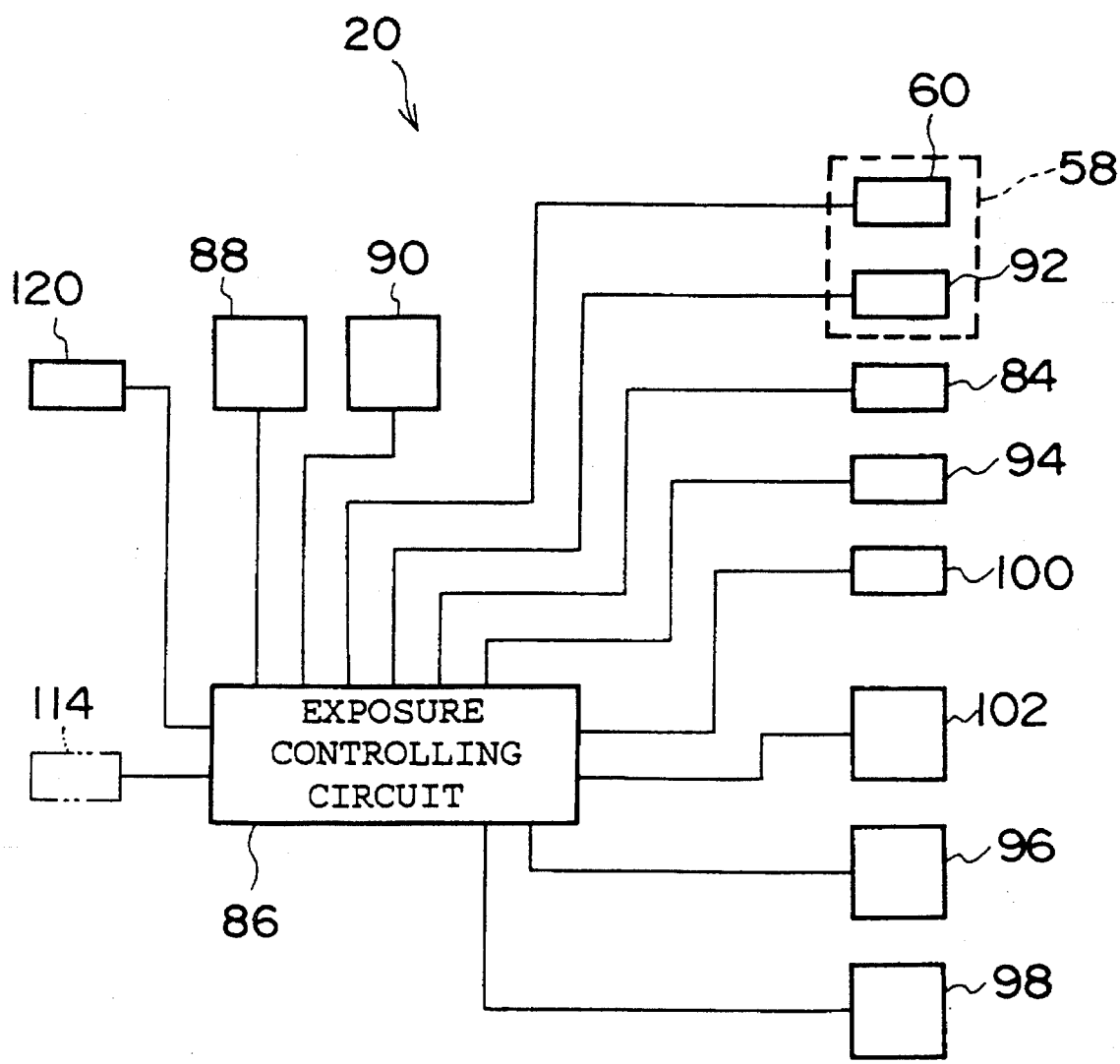

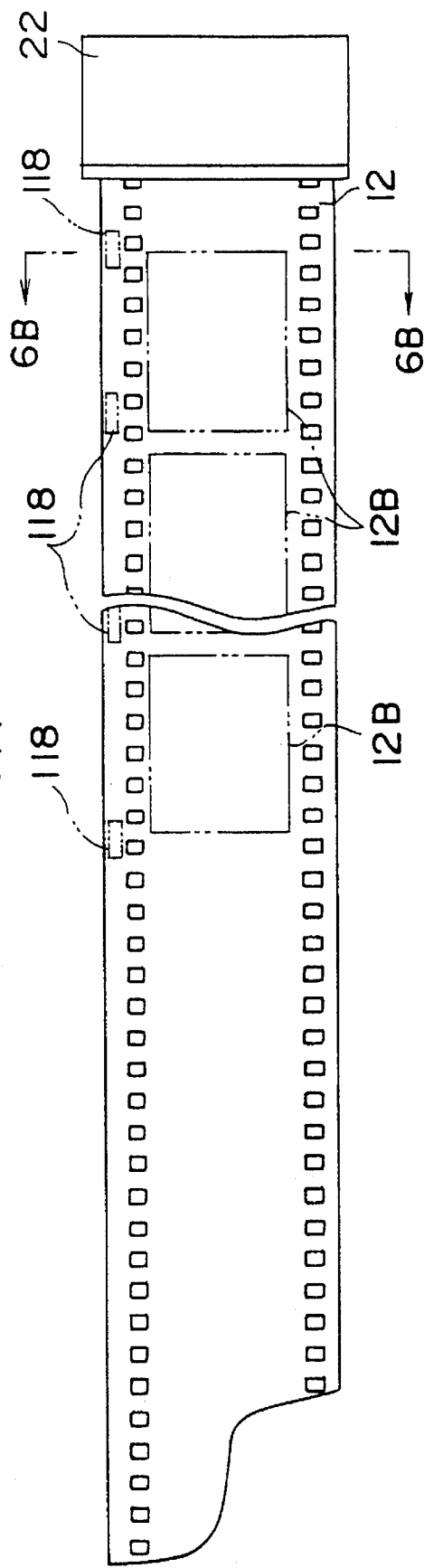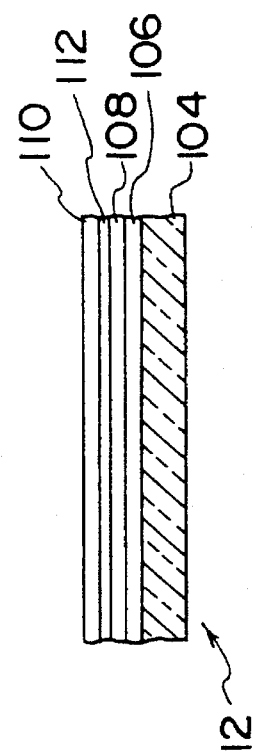

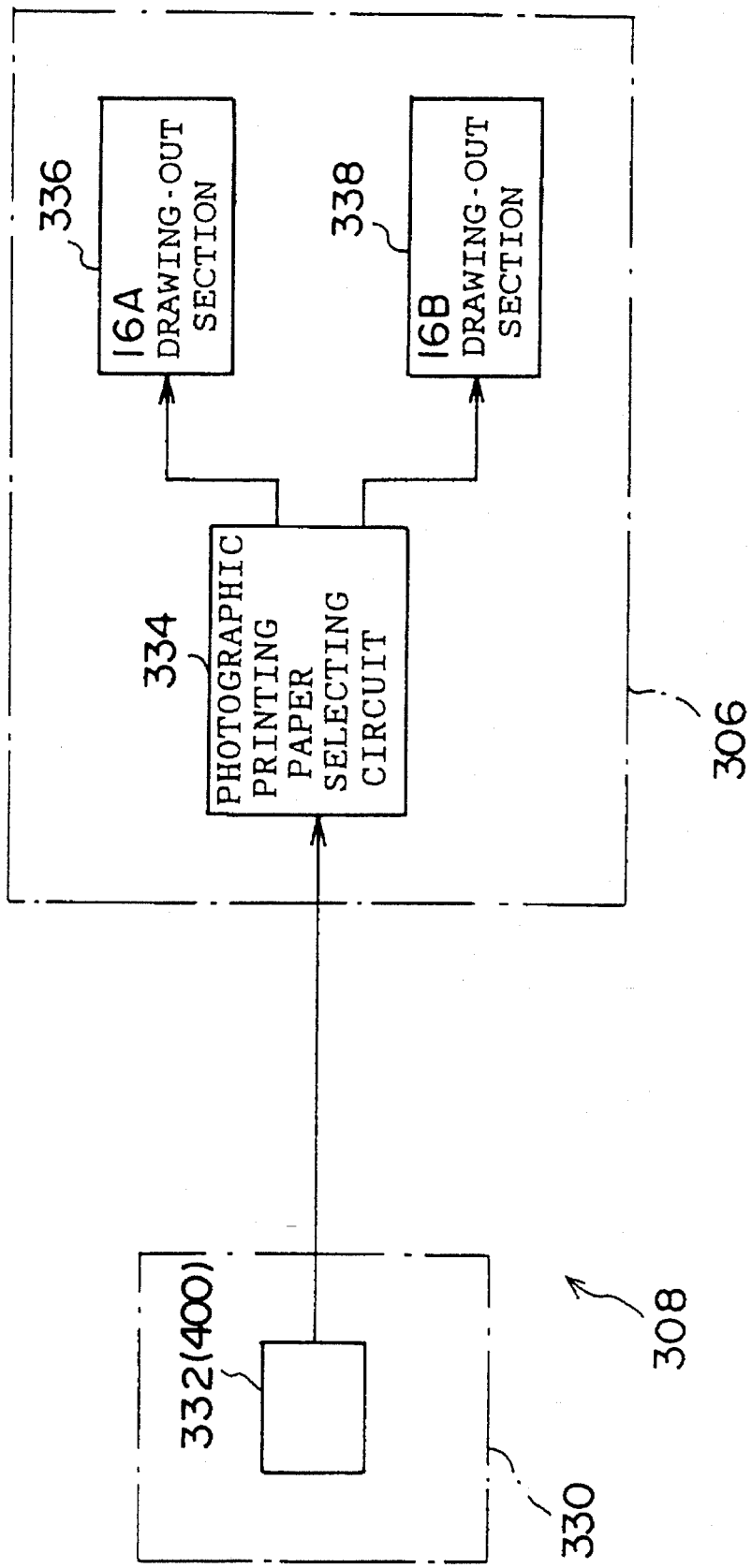

METHOD OF PROCESSING A PHOTOSENSITIVE MATERIAL AND PHOTOSENSITIVE MATERIAL PROCESSOR

BACKGROUND OF THE INVENTION

1. Field of the Invention:

The present invention relates to a method of processing a photosensitive material and a photosensitive material processor which permit the standard processing of general photosensitive materials and the processing of a particular photosensitive material such as for quick processing.

2. Description of the Related Art:

A photographed photographic film (e.g., negative film) is pulled out from a film supplying device, is transported to a developing device where the film is subjected to development processing. Subsequently, the film is exposed on a photographic printing paper for each image frame, and the photographic printing paper is developed as photographic prints. As laboratories for developing and printing such photographed negative films, there are so-called large labs which handle negative films in large volumes and small-scale so-called mini labs which handle negative films in small volumes.

In mini labs, since the amount of processing is small, compact apparatuses are used respectively as an apparatus for developing the negative films, an apparatus for exposing photographic printing papers in accordance with images on the developed negative films, and an apparatus for developing the exposed photographic printing papers. Among such compact apparatuses, there are apparatuses in which the respective steps are integrated to improve the operating efficiency.

There has been a growing number of customers who wish to have their photographed negative films developed soon to see photographic prints, and mini labs capable of effecting short-time processing are increasing in number. In such mini labs, after developing the negative film brought in by the customer, exposure is effected immediately on the photographic printing paper to prepare photographic prints, thereby making it possible to turn over both the developed negative film and the photographic prints to the customer within a short time.

In an attempt to meet such a demand for quick processing, proposals have been made on photosensitive materials such as negative films which are capable of development processing in a short time. Such photosensitive materials capable of quick processing should desirably make it possible to obtain excellent photographic characteristics not only in quick processing but in processing in a standard processing step. However, there are photographic materials which, when processed with standard processing solutions as with general photosensitive materials, make it possible to obtain the same finish as with general photographic materials, but which, in the case of quick processing, produce differences in gradation for each color in the finished photographic prints. In addition, in the case of photosensitive materials which, when subjected to quick processing, are capable of obtaining the same finish as when a standard photosensitive material is subjected to standard processing, there are photosensitive materials which produce differences in gradation if the photosensitive materials are subjected to standard processing.

That is, in the first example, when a negative film for quick processing is subjected to standard processing, it is possible to obtain the same finish as when a negative film for standard processing is subjected to standard processing. However, differences arise in the gradation of each color as compared to the case where the negative film for quick processing is processed by a quick processor. For this reason, it has been virtually difficult to perform the exposure processing of these negative films in the same way as ordinary negative films. Consequently, it has been necessary to separately provide apparatuses for processing the negative films for quick processing when the negative films for quick processing are processed quickly.

SUMMARY OF THE INVENTION

Accordingly, in view of the above-described problems, it is an object of the present invention to provide a method of processing a photosensitive material and a photosensitive material processor which permit not only the processing of photosensitive materials for ordinary processing but also the processing of a particular photosensitive material adapted for quick processing or the like by using ordinary processing solutions, and which permit the particular processing of the particular photosensitive material in correspondence with the characteristic of the photosensitive material.

In accordance with a first aspect of the present invention, there is provided a method of processing a photosensitive material in which after an imagewise exposed first photosensitive material is subjected to development processing in a first processing step, a second photosensitive material is subjected to exposure processing in an exposure step in accordance with a characteristic of an image recorded on the first photosensitive material, comprising the steps of: detecting in the first processing step whether the first photosensitive material is a particular photosensitive material; if it is detected at least that the first photosensitive material is the particular photosensitive material, recording in a predetermined position on the first photosensitive material processing conditions in the first processing step; setting exposure conditions in the exposure step in accordance with one of a result of the detection and the processing conditions recorded on the first photosensitive material; and exposing the second photosensitive material under the set exposure conditions.

In accordance with a second aspect of the present invention, there is provided a photosensitive material processor comprising: a first processor for subjecting an exposed first photosensitive material to development processing; an exposure device for exposing a second photosensitive material in accordance with a characteristic of an image recorded on the first photosensitive material subjected to development processing; a second processor for subjecting an exposed second photosensitive material to development processing; a detecting device for detecting whether the first photosensitive material is a particular photosensitive material; a recording device for recording processing conditions of processing the first photosensitive material by the first processor, in accordance with a result of detection by the detecting device; and an exposure controlling device disposed in the exposure device so as to control the exposure device by reading one of the result of detection by the detecting device and the processing conditions recorded on the first photosensitive material by the recording device.

In accordance with a third aspect of the present invention, there is provided a photosensitive material processor according to the second aspect of the present invention, wherein the detecting device effects the detection by reading information recorded in advance on the first photosensitive material and information recorded in advance on an accommodating portion in which the first photosensitive material is accommodated.

In accordance with a fourth aspect of the present invention, there is provided a photosensitive material processor according to the second aspect of the present invention, wherein, if the first photosensitive material is composed of three dye forming layers for respectively developing different colors, the exposure controlling device determines the processing conditions and whether the first photosensitive material is the particular photosensitive material by measuring and comparing a difference in density between an outermost layer and an intermediate layer of the first photosensitive material subjected to development processing and a difference in density between the intermediate layer and a lowermost layer of the first photosensitive material subjected to development processing.

In accordance with a fifth aspect of the present invention, there is provided a method of processing a photosensitive material in which a second photosensitive material is subjected to exposure processing in an exposure step in accordance with a characteristic of an image recorded on an imagewise exposed first photosensitive material subjected to development processing in a first processing step, comprising the steps of: detecting in the exposure step whether the first photosensitive material is a particular photosensitive material and whether the first photosensitive material has been subjected to particular processing, on the basis of one of information recorded on the first photosensitive material and the image recorded on the first photosensitive material; selecting one of a plurality of second photosensitive materials respectively having different gradation characteristics, on the basis of a result of the detection; and exposing the image on the selected second photosensitive material on the basis of the result of the detection.

In accordance with a sixth aspect of the present invention, there is provided a photosensitive material processor comprising: a first processor for subjecting an exposed first photosensitive material to development processing; an exposure device for exposing a second photosensitive material in accordance with a characteristic of an image recorded on the first photosensitive material subjected to development processing; a second processor for subjecting an exposed second photosensitive material to development processing; a loading device in which a plurality of second photosensitive materials respectively having different gradation characteristics are loaded; a detecting device for detecting whether the first photosensitive material is a particular photosensitive material and particular processing was effected by the first processor, on the basis of one of information and the image recorded on the first photosensitive material; and a selecting device for selecting one of the plurality of second photosensitive materials on the basis of a result of the detection by the detecting device.

In accordance with a seventh aspect of the present invention, there is provided a photosensitive material processor comprising: a first processor for subjecting an exposed first photosensitive material to development processin; an exposure device for exposing a second photosensitive material accordance with a characteristic of an image recorded on the first photosensitve material subjected to development processing; a second processor for subjecting an exposed second photosensitive material to development processing; and an exposure controlling device disposed in the exposure device so as to control the exposure device on the basis of one of a result of detection as to whether the first photosensitive material is a particular photosensitive material and processing conditions recorded on the first photosensitive material.

In accordance with an eighth aspect of the present invention, there is provided a photosensitive material processor comprising: a first processor for subjecting an exposed first photosensitive material to development processing; an exposure device to exposing a second photosensitive material in accordance with a characteristic of an image recorded on the first photosensitive material subjected to development processing; a second processor for subjecting an exposed second photosensitive material to development processing; and an exposure controlling device disposed in the exposure device so as to control the exposure device on the basis of one of a result of detection as to whether the first photosensitive material is a particular photosensitive material and processing conditions recorded on the first photosensitive material, wherein if the first photosensitive material is composed of three dye forming layers for respectively developing different colors, the exposure controlling device determines the processing conditions and whether the first photosensitive material is the particular photosensitive material by measuring and comparing a difference in density between an outermost layer and an intermediate layer of the first photosensitive material subjected to development processing and a difference in density between the intermediate layer and a lowermost layer of the first photosensitive material subjected to development processing.

In accordance with the first aspect of the present invention, the detecting device detects whether the first photosensitive material is a particular photosensitive material, e.g., a photosensitive material for quick processing, or an ordinary photosensitive material (a photosensitive material for standard processing). For example, if the first photosensitive material is a negative film accommodated in a magazine on which a DX code is provided, this DX code is read, and a determination is made as to whether the photosensitive material is a photosensitive material for standard processing or a particular photosensitive material for quick processing or the like.

Here, whether the first photosensitive material is for standard processing or for quick processing as well as whether the first photosensitive material was subjected to quick processing or standard processing are recorded on the first photosensitive material by the recording device. At this time, it suffices if the recording device is capable of reading later at least that the photosensitive material is a particular photosensitive material for quick processing and that the particular photosensitive material was subjected to quick processing.

In the exposure step, when it is determined or detected that the particular photosensitive material was subjected to development processing in quick processing, the second photosensitive material is imagewise exposed under preset exposure conditions. If the exposure conditions at this time are set in such a manner as to compensate such as the difference in gradation occurring in the image recorded on the particular photosensitive material when the particular photosensitive material is subjected to quick processing, such that the image exposed on the second photosensitive material is equivalent to the case in which an image on the photosensitive material for standard processing subjected to standard processing is exposed, it is possible to form an image of fixed quality on the second photosensitive material processed in the second processing step irrespective of the type of first photosensitive material and regardless of whether particular processing was provided.

In accordance with the second aspect of the present invention, when it is detected by the detecting device that the first photosensitive material is a particular photosensitive material, a recording is made on the first photosensitive material to clarify that a particular photosensitive material was subjected to quick processing.

The exposure device effects exposure by setting the exposure conditions on the basis of the result of detection by the detecting device or information recorded on the first photosensitive material. If the exposure conditions are set in advance in such a manner as to compensate a characteristic such as a change in gradation occurring in the image recorded on the particular photosensitive material when the particular first photosensitive material was subjected to quick processing, it is possible to prevent the occurrence of a change in the quality of the image recorded on the second photosensitive material due to the difference in the type of first photosensitive material.

In accordance with the third aspect of the present invention, whether the first photosensitive material is a particular photosensitive material is determined by reading information recorded on the first photosensitive material or the accommodating portion. When the first photosensitive material is a negative film accommodated in a magazine, this information may be that recorded in a DX code. Consequently, it is possible to clearly determine whether the first photosensitive material is a particular photosensitive material.

In accordance with the fourth aspect of the present invention, the difference in density between color components of the first photosensitive material subjected to development processing is measured in the exposure step so as to determine whether the first photosensitive material is a particular photosensitive material and was subjected to quick processing. If the first photosensitive material is a particular photosensitive material for quick processing and is subjected to quick processing, the progress of processing varies for each color, so that a difference occurs among the densities of the respective color components. By detecting such a density difference, even if the processing conditions are not recorded on the first photosensitive material, it is possible to clearly determine whether the photosensitive material is a particular photosensitive material subjected to quick processing.

In accordance with the fifth aspect of the present invention, whether the photosensitive material is a particular photosensitive material and whether particular processing was provided are read from information recorded on the first photosensitive material. One of a plurality of second photosensitive materials prepared in advance is selected on the basis of the information, so as to effect imagewise exposure.

If a second photosensitive material is selected which has a gradation characteristic for compensating a gradation difference occurring depending on the fact that the first photosensitive material is one for standard processing or a particular photosensitive material and on the fact that particular processing was provided, the image formed on the second photosensitive material processed in the second processing step can be provided with substantially the same gradation without substantially changing the exposure conditions.

In accordance with the sixth aspect of the present invention, whether the first photosensitive material is a particular photosensitive material and whether particular processing was provided are read from information recorded on the first photosensitive material. The second photosensitive material is selected by the selecting device on the basis of the result of this reading.

Consequently, regardless of whether the first photosensitive material is a particular photosensitive material and whether particular processing was provided, even if the second photosensitive material is imagewise exposed under substantially fixed exposure conditions, the image formed on the second photosensitive material processed by the second processor produces substantially fixed quality.

In accordance with the seventh aspect of the present invention, the exposure controlling device effects exposure processing by setting the exposure conditions on the basis of the result of the detection or the processing conditions. Consequently, an image having quality which is virtually unchanged from that obtained by processing the first photosensitive material under the conditions of ordinary processing solutions and an ordinary transport speed can be printed onto the second photosensitive material.

In accordance with the eighth aspect of the present invention, the exposure controlling device effects exposure processing by setting the exposure conditions on the basis of the result of the detection or the processing conditions. Consequently, an image having quality which is virtually unchanged from that obtained by processing the first photosensitive material under the conditions of ordinary processing solutions and an ordinary transport speed can be printed onto the second photosensitive material.

Furthermore, if the first photosensitive material is composed of three dye forming layers for respectively developing different colors, it is possible to reliably determine the processing conditions and whether the first photosensitive material is the particular photosensitive material by comparing differences in density between the respective dye forming layers.

Next, a specific description will be given of the present invention including standard processing and quick processing serving as particular processing.

Standard processing refers to development processing in which the color development time is not less than 3 minutes and not more than 5 minutes, and processing in which the "dry to dry" time is not less than 8 minutes and not more than 35 minutes. Meanwhile, quick processing refers to development processing in which the color development time is not more than 1 minute and 30 seconds, and processing in which the "dry to dry" time is not less than 1 minute and not more than 6 minutes.

In standard processing, the development time in color development processing is not less than 3 minutes, and color development solutions are those described in Japanese Patent Application Laid-Open No. 3-33847 on page 9, sixth line in upper left column to page 11, sixth line in lower right column. Specifically, the following may be used with satisfactory results: a color negative film processing agent CN-16 and color development solutions and a color development replenisher CN-16X, CN-16Q, and CN-16FA made by Fuji Photo Film Co., Ltd., and a color negative film processing agent CN-16 and a color development solution and a color development replenisher C-41B and C-41RA made by Eastman Kodak Co., and so on.

As color developing agents in the color developing solutions, it is possible to use known primary aromatic amine color developing agents. Preferable color developing agents are p-phenylenediamine derivatives, and typical examples are shown below, but are not limited to the same:

D-1 N,N-diethyl-p-phenylenediamine
D-2 2-methyl-N, N-diethyl-p-phenylenediamine
D-3 4-[N-ethyl-N-($\beta$-hydroxyethyl) amino]aniline
D-4 2-methyl-4-[N-ethyl- N-($\beta$-hydroxyethyl) amino] aniline D-6 4-amino-3-methyl-N-ethyl-N-[β-(methanesulphonamide)ethyl]aniline D-7 4-amino-3-methyl-N-ethyl-N-methoxyethylaniline D-8 4-amino-3-methyl-N-ethyl-N-(4-hydroxybutyl)aniline D-9 4-amino-3-methyl-N-ethyl-N-(3-hydroxybutyl)aniline D-10 4-amino-3-methoxy-N,N-bis (3-hydroxypropyl) aniline D-11 4-amino-3-methoxy-N,N-bis (4-hydroxbutyl)aniline D-12 4-amino-3-methoxy-N-hydroxyethyl-N-(4-hydroxbutyl) aniline It should be noted that D-4, D8, D-9, D-10, D-11, and D-12 are more preferable as the color developing agents.

In the color development processing for quick processing, the developing time is not more than 1 minute and 30 seconds, preferably not less than 30 seconds and not more than 1 minute and 30 seconds, and more preferably not less than 45 seconds and not more than 1 minute and 20 seconds. The amount of the developing agent is preferably not less than 18 millimols and not more than 60 millimols per one litter of the developing solution, more preferably not less than 25 millimols and not more than 50 millimols. The preferable content of the developing agent is such that the concentration of the developing agent in color development processing for quick processing becomes 1.5-fold to 5-fold that for color development processing for standard processing. The processing temperature of color development processing for quick processing is preferably not less than 38° C. and not more than 50° C., more preferably not less than 40° C. and not more than 45° C.

As an antifoggant, halogen ions may be contained in the color developing agent. The concentration of halogen ions for color development processing in quick processing is preferably 1.5-fold to 5-fold that for color development processing in standard processing. In particular, in a case where the concentration of the developing agent in color development processing for quick processing is 1.5-fold to 5-fold that for color development processing for standard processing, the concentration of halogen ions for color development processing in quick processing is most preferably 1.5-fold to 5-fold. Specifically, the halogen ion concentration is 16 millimols to 58 millimols per one litter of the developing solution, preferably 20 millimols to 42 millimols. As halogen ions, bromide ions are particularly preferable, and iodine ions or chloride ions may be contained, as necessary.

As compounds for directly preserving the aforementioned primary aromatic amine color developing agents, the following may be contained in the color developing agent: various hydroxylamines disclosed in Japanese Patent Application Laid-Open Nos. 63-5341, 63-106655, or 4-144446; hydroxamic acids disclosed in Japanese Patent Application Laid-Open No. 634313; hydrazines and hydrazides disclosed in Japanese Patent Application Laid-Open No. 63-146041; phenols disclosed in Japanese Patent Application Laid-Open Nos. 63-44657 and 63-58443; α-hydroxyketones and α-aminoketones disclosed in Japanese Patent Application Laid-Open No. 63-44656; and various saccharides disclosed in Japanese Patent Application Laid-Open No. 63-36244. In addition, in conjunction with the foregoing compounds, it is possible to use the following: monoamines disclosed in Japanese Patent Application Laid-Open Nos. 63-4235, 63-24254, 63-21647, 63-146040, 63-27841, 63-25654, and the like; diamines disclosed in Japanese Patent Application Laid-Open Nos. 63-30845, 63-14640, 63-43139, and the like; polyamines disclosed in Japanese Patent Application Laid-Open Nos. 63-21647, 63-26655, and 63-44655; nitroxy radicals disclosed in Japanese Patent Application Laid-Open No. 63-53551; alcohols disclosed in Japanese Patent Application Laid-Open Nos. 63-43140 and 63-53549; oximes disclosed in Japanese Patent Application Laid-Open No. 63-56654; and tertiary amines disclosed in Japanese Patent Application Laid-Open No. 63-239447.

As other preservatives, it is possible to contain, as necessary, the following: various metals disclosed in Japanese Patent Application Laid-Open Nos. 57-44148 and 57-53749; salicyclic acids disclosed in Japanese Patent Application Laid-Open No. 59-180588; alkanolamines disclosed in Japanese Patent Application Laid-Open No. 54-3582; polyethylene imines disclosed in Japanese Patent Application Laid-Open No. 56-94349; and aromatic polyhydroxy compounds and the like disclosed in U.S. Pat. No. 3,746,544.

Particularly preferable preservatives are hydroxylamines shown by a general formula (1) in Japanese Patent Application Laid-Open No. 3-144446. Among others, such compounds having sulfonic groups or carboxy groups are preferable.

As other color developing solutions, it is possible to use various additives disclosed in the aforementioned Japanese Patent Application Laid-Open No. 3-144446. As buffers for holding the pH, it is possible to cite such as carbonic acids, phosphoric acids, boric acids, hydroxybenzoic acids that are listed in the same specification on page 9, sixth line in utter right column to first line in lower left column. As chelating agents, it is possible to cite various aminopolycarboxylic acids, phosphonic acids, and sulfonic acids. Preferable chelating agents are ethylenediamine tetraacetic acid, triethylenetetramine hexaacetic acid, 1,3-diaminopropanol tetraacetic acid, diethylenetriamine pentaacetic acid, ethylenediamine-N,N,N',N'-tetrakis(methylenephosphonic acid), catechol-3,5-disulfonic acid. As development accelerators, it is possible to cite various additives listed in the same specification on page 9, 19th line in lower left column to page 10, seventh line in upper right column. As antifoggants, it is possible to cite halogenated ions and organic antifoggants listed in the same specification on page 10, eighth line in upper right column to fifth line in lower left column. In addition, it is possible to add, as required, various surface active agents such as alkyl sulfonic acid, aryl sulfonic acid, aliphatic carboxylic acid, and aromatic caroxylic acid.

In addition, when processing is effected by a photographic processor (photosensitive material processor) by using a color developing solution, the area where the color developing solution comes into contact with air (area of the opening) should preferably be as small as possible. For example, if a value obtained by dividing the opening area ($cm^2$) by the volume ($cm^3$) of the developing solution is set as an opening ratio, the opening ratio is preferably 0.01 $cm^{-1}$, preferably 0.005 $cm^{-1}$.

The color developing solution may be used by being regenerated. The regeneration of the color developing solution means that the activity of the color developing solution is increased by allowing a used developing solution to be brought into contact with an anion exchange resin or to be subjected to electrolysis, or by adding processing chemicals called regenerating agents, so as to use the solution again as the color developing solution. In this case, the regeneration rate (the ratio of the overflowing solution in the replenishing solution) is preferably 50% or more, more preferably 70% or more. In processing by using the regenerated color developing solution, after the overflowing solution of the color developing solution is regenerated, the solution is used as the replenishing solution.

As a method of regenerating the color developing solution, it is preferable to use the anion exchange resin. In particular, as the composition of an anion exchange resin and a regenerating method which are preferable, it is possible to cite those that are listed in the DIA-ION MANUA1 (1) (1986, 14th Edition) published by Mitsubishi Chemical Industries, Ltd. Among the anion exchange resins, resins of the compositions disclosed in Japanese Patent Application Laid-Open Nos. 2-952 and 1-281152.

Here, if a color negative film for quick processing is such that when the film is subjected to standard processing, an image of the same gradation as that of the color negative film subjected to standard processing is formed, while a soft-gradation image is formed when the film is subjected to quick processing, then an image of a soft gradation is formed on the color photographic printing paper when the image recorded on this color negative film for quick processing is imagewise exposed on the color photographic printing paper under the same conditions as those for the image recorded on the negative film for standard processing subjected to standard processing.

In coping with this problem, in the present invention, the exposure conditions or the second photosensitive material is set or selected in accordance with the image recorded on the color negative film for quick processing subjected to quick processing, so that the image recorded on the color negative film for quick processing subjected to quick processing can be recorded on the color photographic printing paper with a gradation similar to that of the image recorded on the color negative film for standard processing subjected to standard processing. Consequently, an image of substantially the same quality and having no gradation difference can be formed on the second photosensitive material by a single processor regardless of whether the first photosensitive material is one which has been subjected to standard processing or quick processing.

As described above, according to the method of processing of a photosensitive material in accordance with the present invention, in a case where the first photosensitive material is a particular photosensitive material, the setting of the exposure conditions is changed in the exposure step, and the exposure conditions are set in such a manner as to compensate the difference in the characteristic occurring in the image of a particular first photosensitive material depending on standard processing and particular processing. Accordingly, even a photosensitive material requiring particular processing can be provided with standard processing.

In addition, with the photosensitive material processor in accordance with the present invention, even if the photosensitive material requiring particular processing is subjected to development processing in the same way as the standard photosensitive material, substantially no difference is produced in the image recorded on the second photosensitive material and processed. As a result, it is possible to obtain outstanding advantages in that particular photosensitive materials can be processed by a processor for processing ordinary photosensitive materials without providing a special processor for processing the particular photosensitive materials, and that particular processing such as quick processing can be effected as required.

The above and other objects, features and advantages of the present invention will become more apparent from the following detailed description of the invention when read in conjunction with the accompanying drawings.

BRIEF DESCRIPTION OF THE DRAWINGS

FIG. 5 is a block diagram illustrating a schematic configuration of the exposure device used in this embodiment;

FIG. 6A is a schematic plan view of a negative film;

FIG. 6B is a schematic cross-sectional view of the negative film taken along line 6B—6B in FIG. 6A;

FIG. 11 is a schematic block diagram illustrating a printing-paper selecting device used in the second embodiment.

DESCRIPTION OF THE PREFERRED EMBODIMENTS

Figure 1:
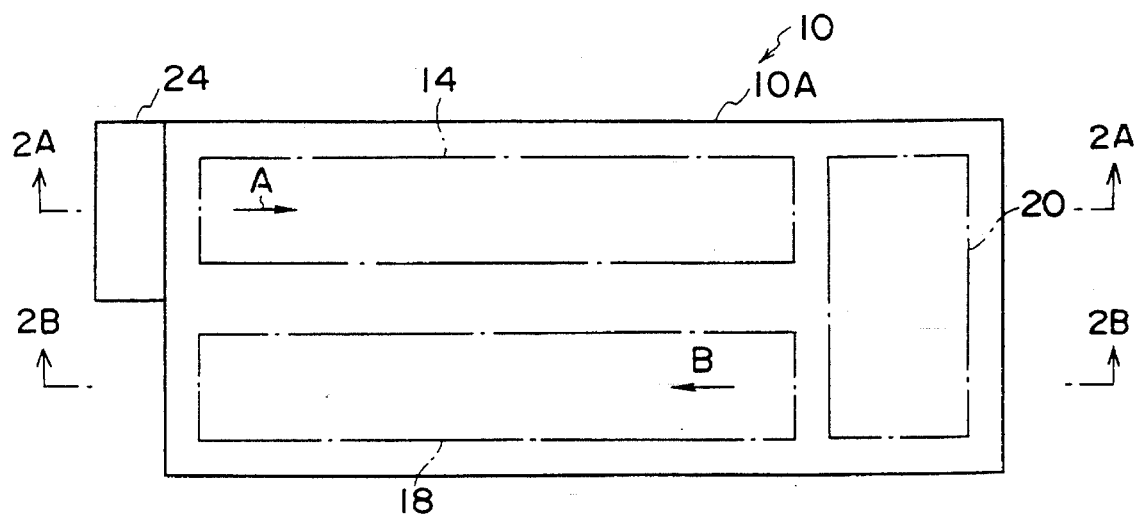
FIG. 1 is a schematic diagram illustrating a plan view of a photographic processor used in an embodiment of the present invention.
Figure 2A:
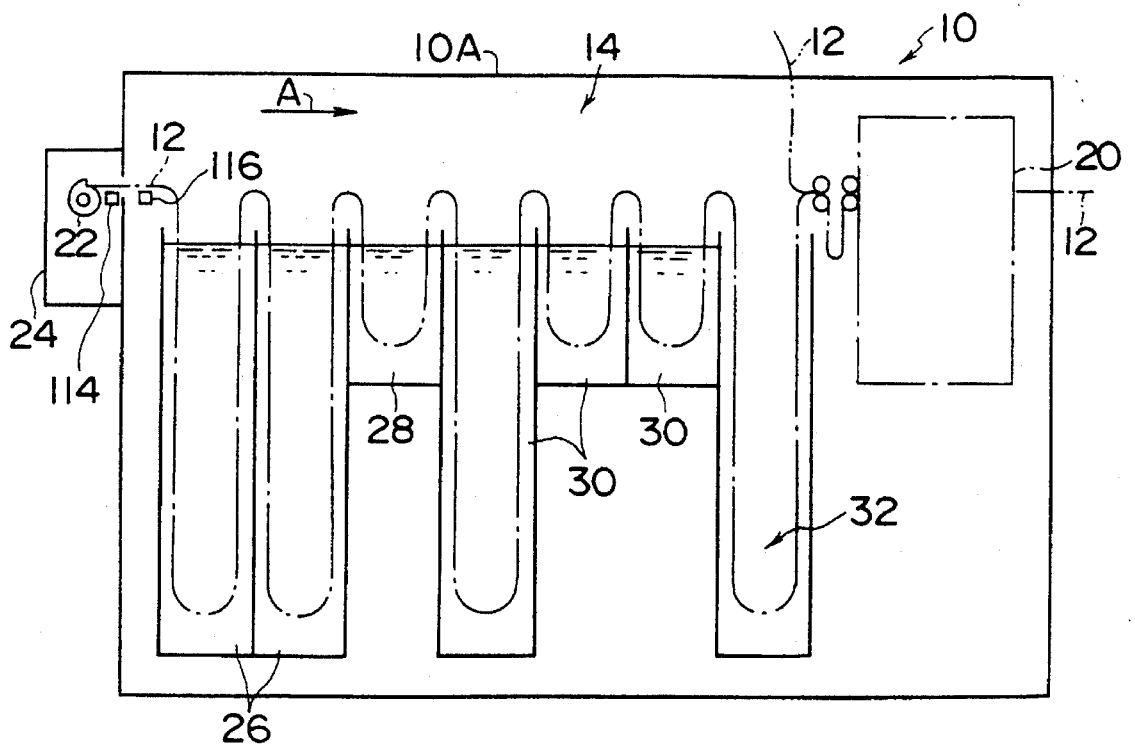
FIG. 2A is a side elevational view illustrating a schematic arrangement of a film processor as viewed along line 2A—2A in FIG. 1.
Figure 2B:
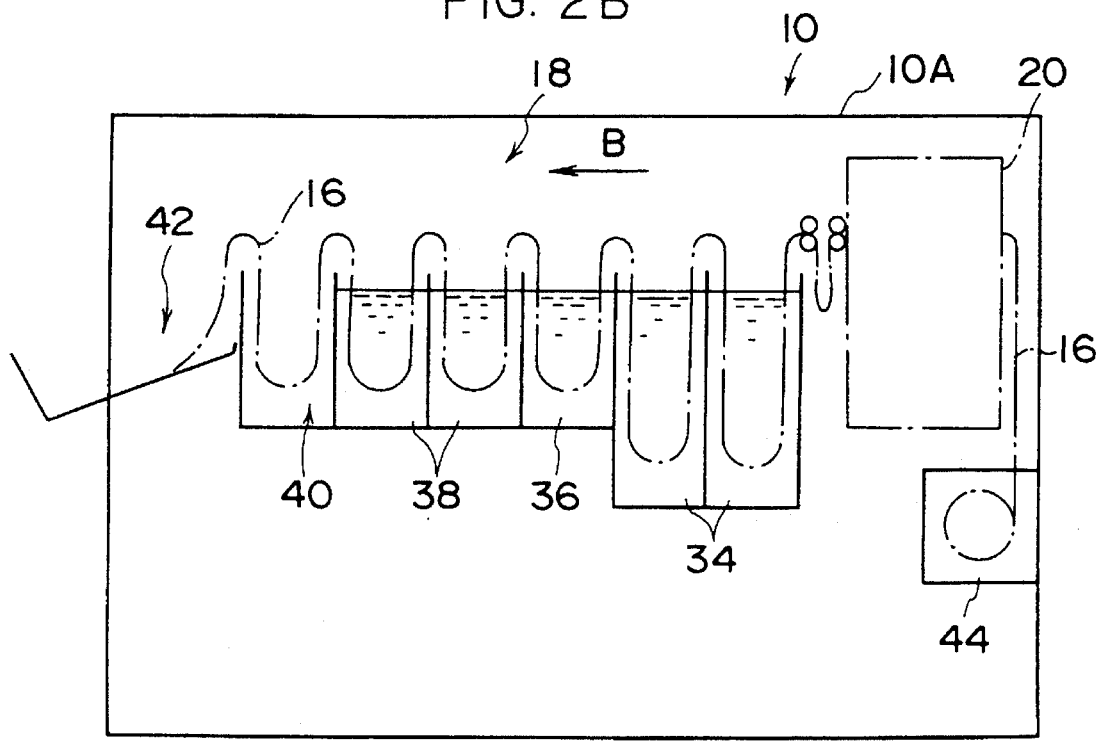
FIG. 2B is a side elevational view illustrating a schematic arrangement of the film processor as viewed along line 2B—2B in FIG. 1.

FIGS. 1, 2A, and 2B show a schematic arrangement of a photographic processor 10 which is used in an embodiment of the present invention as an example of a photosensitive material processor. FIG. 1 shows a schematic arrangement of the photographic processor 10 as viewed from the top side of the photographic processor 10. FIGS. 2A and 2B schematically illustrate the interior of the photographic processor 10 as viewed along the line 2A—2A and the line 2B—2B of FIG. 1, respectively.

The photographic processor 10 comprises a film processor 14, which is a first processor for subjecting a negative film 12 serving as a first photosensitive material to color development, bleach-fixing, washing, and dry processing; a photographic printing paper processor 18, which is a second processor for subjecting a photographic printing paper 16 serving as a second photosensitive material to color development, bleach-fixing, washing, and dry processing; and an exposure device 20 for consecutively exposing images recorded on the negative film 12 processed by the film processor 14 onto the photographic printing paper 16. The film processor 14, the photographic printing paper processor 18, and the exposure device 20 are integrally accommodated in a casing 10A whose interior is shielded from light.

The film processor 14 is provided with a magazine loading section 24 in which magazines 22 are loaded, the negative film 12 imagewise exposed by an unillustrated camera or the like being accommodated in each magazine 22. The negative film 12 is drawn out from the magazine 22 loaded in the magazine loading section 24, and is fed into the film processor 14.

FIGS. 6A and 6B show the negative film 12 which is used in this embodiment. In this negative film 12, a cyan dye forming layer (C dye forming layer 106) which is sensitized by red light, a magenta dye forming layer (M dye forming layer 108) which is sensitized by green light, and a yellow dye forming layer (Y dye forming layer 110) which is sensitized by blue light are formed in that order on a polyethylene terephthalate (PET) base 104. A yellow filter 112 is formed between the Y dye forming layer 110, i.e., an outermost layer, and the M dye forming layer 108 formed therebelow. The negative film 12 is exposed by the light radiated from the side of the Y dye forming layer 110, i.e., the outermost layer.

As shown in FIG. 2A, the magazine loading section 24 is provided with a reader 114 for reading a DX code (not shown) which is provided on the loaded magazine 22 in the form of a bar code. In the photographic processor 10, it is possible to determine from the DX code read by the reader 114 whether the negative film 12 accommodated in the magazine 22 is for standard processing or for specific processing (quick processing, hereafter referred to as a negative film 12A when specifically discriminated). Incidentally, the negative film 12A for quick processing is provided with predetermined quick processing, so that it is possible to obtain images of the same quality as that of the negative film 12 subjected to standard processing.

A developing tank 26 in which a color developing solution is accommodated, a bleach-fixing tank 28 in which a bleach-fixing solution is accommodated, a washing tank 30 in which washing water is accommodated, and a drying section 32 for drying the washed negative film 12 are provided in the film processor 14. The negative film 12 drawn out from the magazine 22 is transported consecutively in the developing tank 26, the bleach-fixing tank 28, and the washing tank 30 at a predetermined transporting speed (in the direction of arrow A shown in FIGS. 1 and 2A), so as to be subjected to color development, bleach-fixing, and washing. The negative film 12 is then transported to the drying section 32 so as to be subjected to dry processing. Incidentally, although, in the film processor 14, the color developing solution and the bleach-fixing solution are used to process the negative film 12 for standard processing, when the negative film 12A for quick processing is processed, it is possible to provide quick processing by increasing the transporting speed.

In the film processor 14, a recorder 116 is disposed between the magazine loading section 24 and the developing tank 26. When the reader 114 detects that the negative film is the negative film 12A for quick processing, the recorder 116 records in a predetermined position on the negative film 12A that the quick processing is to be provided for the negative film 12A for quick processing.

As shown in FIG. 6A, as a method of recording the aforementioned information on the negative film 12A, a bar code 118 is recorded at predetermined intervals as latent images in non-image portions (portions other than image frame areas 12B) of the negative film 12A in side portions adjacent to perforations. The bar code 118 is made visible if the negative film 12A is subjected to development processing. Incidentally, the information is not confined to the bar code 118, and may be information recorded by various recording means. In addition, when a DX code or the like is recorded on the negative film 12A as a latent image, an area where the DX code has been recorded is avoided.

As shown in FIG. 2B, a developing tank 34, a bleach-fixing tank 36, and a washing tank 38, in which a color developing solution, a bleach-fixing solution, and washing water for processing the photographic printing paper 16 are respectively accommodated, are provided in the photographic printing paper processor 18. In addition, a drying section 40 for drying the photographic printing paper 16 for which wash processing has been completed and a receiving box 42 for stocking the photographic printing papers 16 for which dry processing has been completed are also provided in the photographic printing paper processor 18.

The photographic printing paper 16 which has been imagewise exposed is transported consecutively in the developing tank 34, the bleach-fixing tank 36, and the washing tank 38 at a predetermined transporting speed (in the direction of arrow B shown in FIGS. 1 and 2B). Thus, the photographic printing paper 16 is immersed in the respective processing solutions so as to be subjected to color development, bleach-fixing, and wash processing. Further, if wash processing is completed for the photographic printing paper 16 is subjected to dry processing in the drying section 40, and is discharged to the receiving box 42. The photographic printing paper 16 discharged to the receiving box 42 is cut for each image frame, and is thereby produced as a photographic print.

The negative film 12 processed in the film processor 14 is transported to the exposure device 20 disposed between the film processor 14 and the photographic printing paper processor 18. A paper magazine 44 in which unexposed photographic printing paper 16 in the form of a roll is accommodated is loaded in the photographic processor 10. The unexposed photographic printing paper 16 is drawn out beginning with the peripheral end of the roll, is fed into the exposure device 20, and is transported to the photographic printing paper processor 18 via the exposure device 20. In addition, upon completion of the exposure the negative film 12 is discharged from the exposure device 20 to outside the machine. Incidentally, developed negative film 12 can be inserted between the film processor 14 and the exposure device 20 from outside the machine, and, for instance, the developed negative film 12 to be reprinted is inserted.

Figure 3:
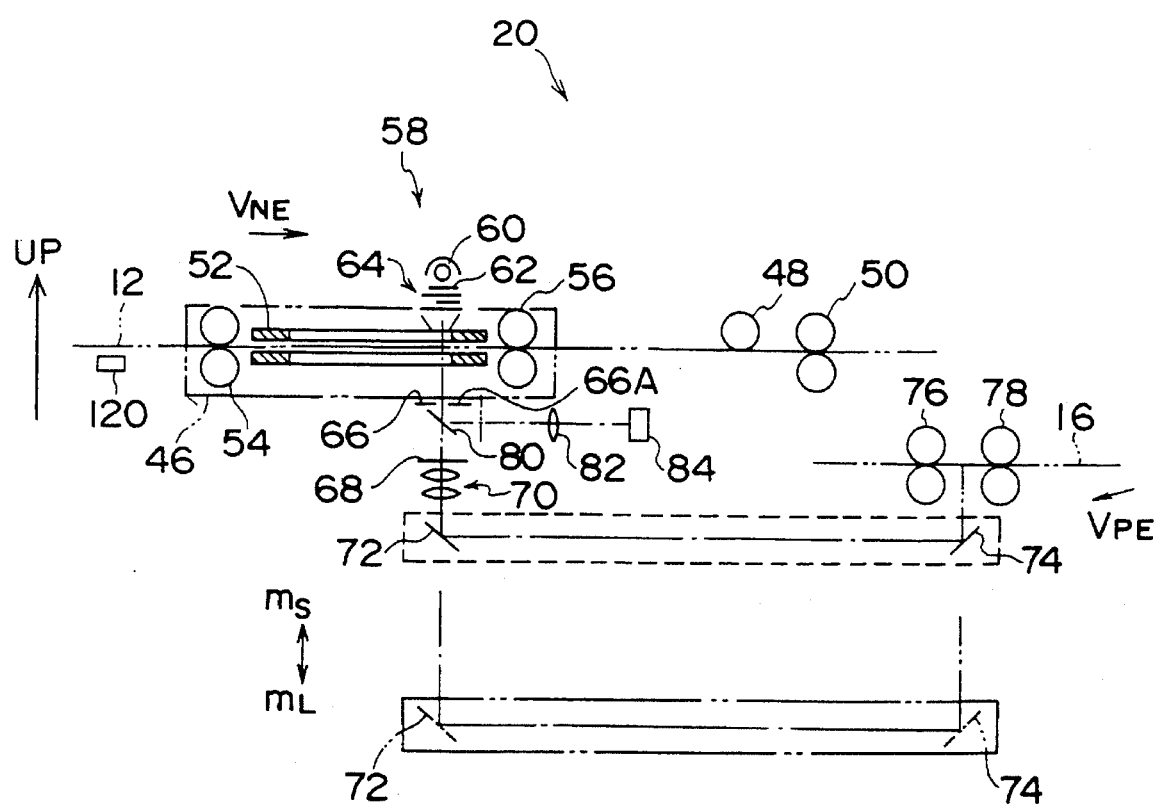
FIG. 3 is a schematic diagram of an exposure device used in this embodiment.
Figure 4A:
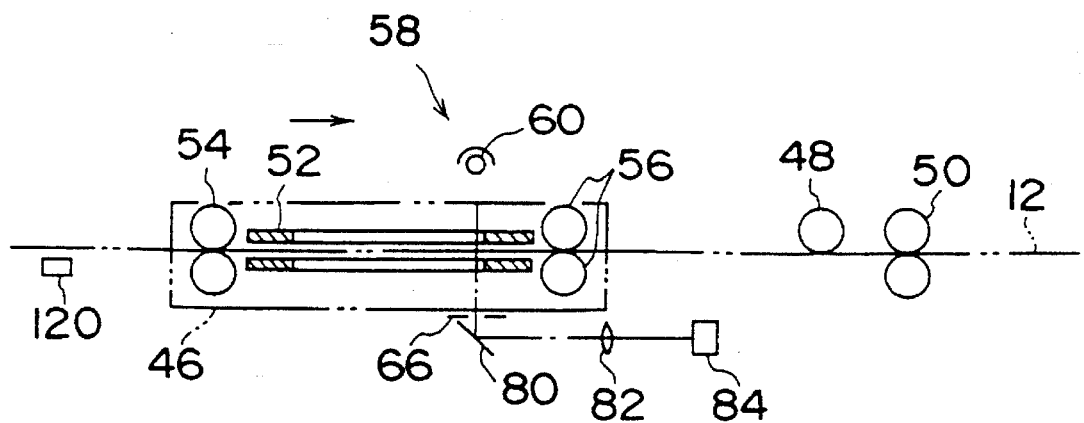
FIG. 4A is a schematic diagram illustrating the movement of a negative carrier when the density of slit light is measured in the exposure device, and shows a starting position in the movement of the negative carrier.
Figure 4B:
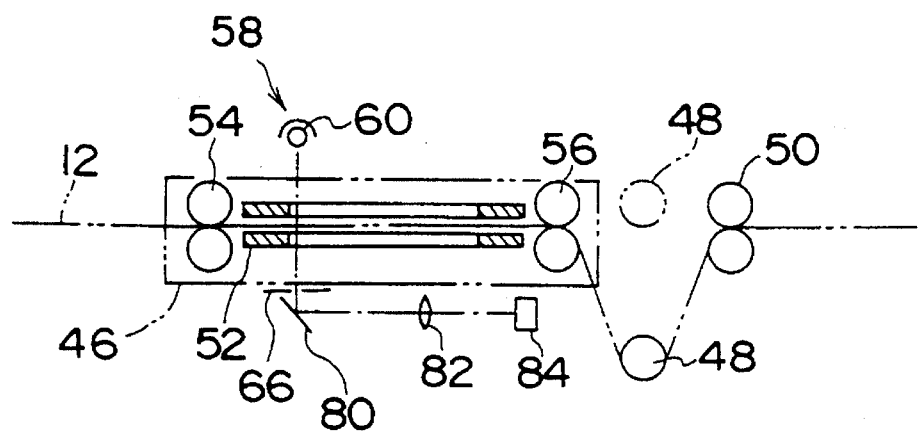
FIG. 4B is a schematic diagram illustrating the movement of the negative carrier when the density of slit light is measured in the exposure device, and shows a terminating position in the movement of the negative carrier.

FIG. 3 shows a schematic arrangement of the exposure device 20 provided in the photographic processor 10. Incidentally, the direction indicated by the arrow UP is an upward direction of the exposure device 20. In this exposure device 20, a negative carrier 46, a tension roller 48, and a pair of transport rollers 50 are arranged along the transporting direction of the negative film 12. A negative mask 52 for masking peripheral portions of the image frame area 12B (see FIG. 6A) of the negative film 12, as well as pairs of transport rollers 54, 56 for holding the negative film 12 by nipping it on both sides of the negative mask 52 in the transporting direction of the negative film 12 and for transporting the negative film 12 by being rotatively driven, are disposed in the negative carrier 46. These pairs of transport rollers 50, 54, and 56 are driven by a film transporting motor 90 (see FIG. 5) connected to an exposure controlling circuit 86 (see FIG. 5).

The negative film 12 is transported to the negative carrier 46, and when the image frame area 12B is brought to a position where an opening of the negative mask 52 is disposed, the transport is temporarily stopped, and exposure processing is carried out. Upon completion of the exposure processing, the negative film 12 is fed into a nip between the pair of transport rollers 50, and an ensuing image frame area 12B is placed in the negative mask 52, and is subjected to exposure processing.

A light source unit 58 is provided above the negative carrier 46. This light source unit 58 has a light source 60, a heat shielding filter 62, and a color adjusting filter 64, and a color-adjusting-filter driving circuit 92 for driving the light source 60 and the color adjusting filter 64 is connected to the exposure controlling circuit 86 (see FIG. 5). If the light source 60 is turned on by the exposure controlling circuit 86, the light from the light source 60 is applied to the negative film 12 via the heat insulating filter 62 and the color adjusting filter 64. In addition, a slit mask 66 in which a slit 66A for exposure is formed is provided below the negative carrier 46, and part of the light which is transmitted through the negative film 12 passes through the slit 66A. Incidentally, the slit 66A is formed with a small width and extends in a direction perpendicular to the traveling direction of the negative film 12 (i.e., in a direction perpendicular to the plane of the drawing of FIG. 3).

A shutter 68, a printing lens 70, and a pair of reflecting mirrors 72 and 74 are provided on the side of the slit masks 66 which is away from the negative carrier 52. A shutter driving motor 100 (see FIG. 5) for driving the shutter 68, a printing-lens driving circuit 102 (see FIG. 5) for driving the printing lens 70, and a reflecting-mirror driving motor 96 (see FIG. 5) for moving the reflecting mirrors 72 and 74 are connected to the exposure controlling circuit 86. The slit light which has passed through the slit 66A in the slit mask 66 is transmitted through the printing lens 70, is reflected by the reflecting mirrors 72 and 74, and reaches an exposing position between two pairs of transport rollers 76 and 78.

The transport rollers 76 and 78 nip and transport the photographic printing paper 16 drawn out from the paper magazine 44 (see FIG. 2) as a printing-paper transporting motor 98 (see FIG. 5) connected to the exposure controlling circuit 86 is driven. The slit light forms an image on the surface of the photographic printing paper 16 nipped by the transport roller pairs 76 and 78. As the negative carrier 46 moves, an image is formed by the slit light transmitted through the negative film 12 placed in the negative carrier 46, whereby exposure is effected in accordance with the image recorded on the negative film 12 (slit exposure).

In addition, a reader 120, which is provided on the upstream side of the negative carrier 46 in the traveling direction of the film, is connected to the exposure controlling circuit 86. When the negative film 12 for reprinting is fed in, the reader 120 reads the information recorded on the negative film 12, and the exposure controlling circuit 86 detects whether or not the negative film 12 is for quick processing and, if so, whether or not quick processing has been provided.

Figure 9:
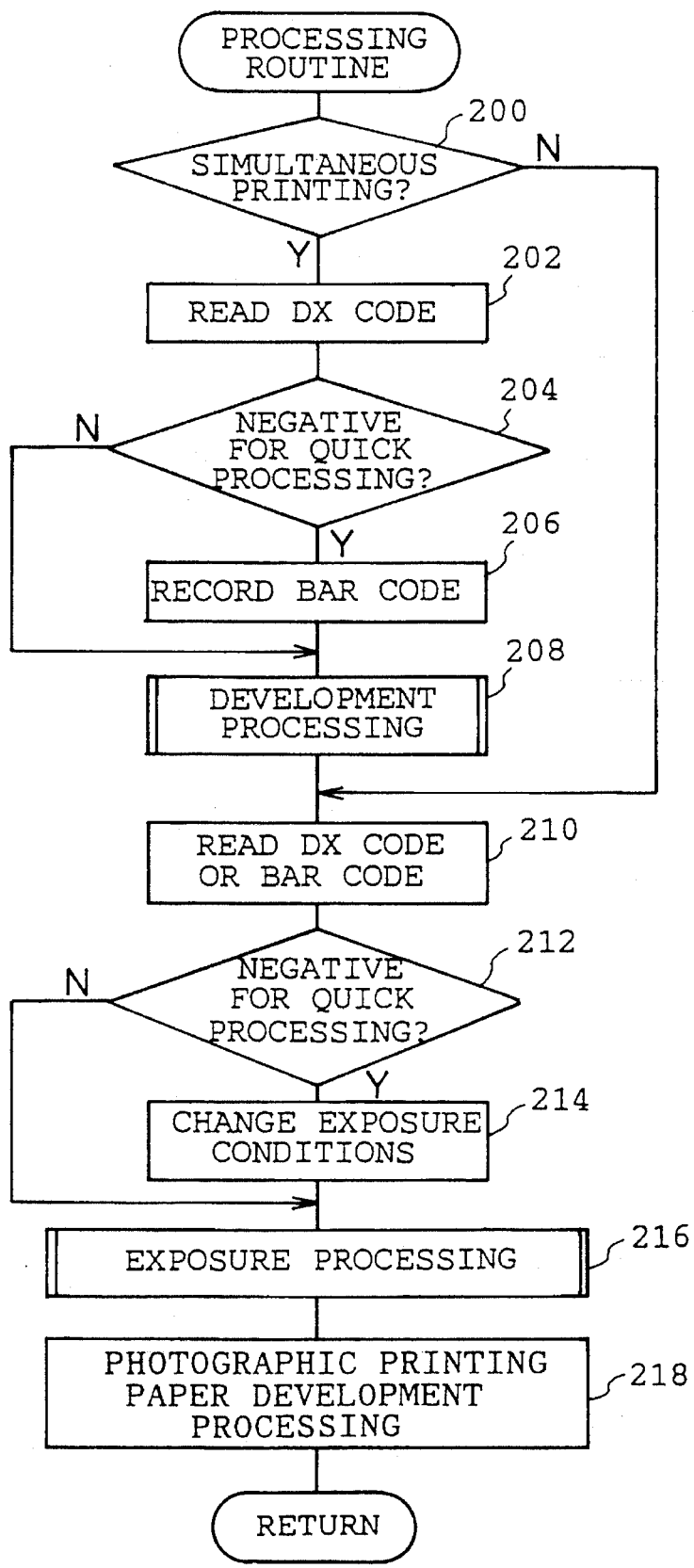
FIG. 9 is a flowchart illustrating the flow of processing by the photographic processor used in this embodiment.

Referring now to the flowchart shown in FIG. 9, a description will be given of the operation of this embodiment. It should be noted that this flowchart shows the flow of processing from the development processing of the negative film 12 until the development processing of the photographic printing paper 16 in the photographic processor 10.

In an initial Step 200, selection is made as to whether print processing is ordinary print processing, i.e., simultaneous print processing, or reprint processing. If ordinary print processing is to be effected, the magazine 22 in which exposed negative film 12 is accommodated is loaded in the magazine loading section 24 of the photographic processor 10. Subsequently, the negative film 12 is pulled out from the magazine 22, and processing is started.

In Step 202, the DX code on the magazine 22 loaded in the magazine loading section 24 is read by the reader 114, and a determination is made as to whether or not the film is the negative film 12A for quick processing (Step 204). Here, if it is determined that the film is the negative film 12A for quick processing, the operation proceeds to Step 206. While the bar code 118 is being printed on the negative film 12A by the recorder 116 in this step, the negative film 12A is transported to the developing tank 26 so as to effect the development processing of the negative film 12 (Step 208). Incidentally, if the film is the negative film 12 for standard processing or the negative film 12 for quick processing subjected to standard processing, the operation may proceed to Step 208 without recording the bar code 118, or other processing information may be recorded.

In the film processor 14, after color development, bleach-fixing, and wash processing are effected while transporting the negative film 12, the negative film 12 for which development processing has been completed is transported to the exposure device 20. At this time, latent images recorded in non-image portions of the negative film 12A for quick processing subjected to quick processing are made visible, thereby clearly indicating the fact that the negative film 12A for quick processing has been subjected to quick processing.

In the exposure device 20, prior to exposure processing, the DX code or the bar code 118 recorded on the negative film 12 is read by the reader 114 (Step 210) to confirm whether the negative film 12 is the negative film 12A for quick processing or whether it has been quick processed (212). Here, if the negative film 12A for quick processing is being quick processed, the operation proceeds to Step 214 to change the exposure conditions.

In the exposure device 20, when the negative film 12A for quick processing has been quick processed, the exposure conditions are thus changed to exclusive exposure conditions which have been set and recorded in advance, and exposure is then started (Step 216).

The exposure processing by the exposure device 20 is effected by subjecting the image recorded on the negative film 12 to slit exposure on the unexposed photographic printing paper 16 while the photographic printing paper 16 is being pulled out from the paper magazine 44. At this time, the slit light originating from the light source unit 58 and transmitted through the negative film 12 is measured by a sensor 84, and the setting of detailed exposure conditions is carried out.

Upon completion of the exposure processing, the photographic printing paper 16 is transported to the photographic printing paper processor 18 to effect development processing (Step 218). It should be noted that, when reprint processing is effected, the bar code 118 recorded on the negative film 12 is read in Step 210 to determine whether or not the film is the negative film 12A for quick processing or whether or not it has been quick processed.

When the negative film 12A for quick processing has been quick processed, progress in the processing of the C dye forming layer 106, i.e., the lowermost layer close to the base 104, lags behind progress in the processing of the Y dye forming layer 110, i.e., the outermost layer. For this reason, it suffices if the exposure controlling circuit 86 causes the light source unit 58 to emit light which has been color-adjusted to compensate the lag in the respective processing of the color dye forming layers 106–110. When the negative film 12A for quick processing used in this embodiment is subjected to quick processing, the image exposed on the photographic printing paper 16 exhibits a soft gradation. If the exposure conditions are set in advance so as to compensate this soft gradation, even in the case o the negative film 12A for quick processing subjected to quick processing, it is possible to prevent the image exposed on the photographic printing paper 16 from exhibiting a soft gradation, and to finish the print with quality equivalent to that of a print on which an image of the negative film 12 for standard processing is exposed.

Consequently, the balance of the colors of the light emitted from the light source unit 58 and transmitted through the negative film 12A can be made substantially equivalent to the balance of those of the light transmitted through the negative film 12 for standard processing. For this reason, on the photographic prints discharged from the photographic printing paper processor 18, even the images recorded on the negative film 12A for quick processing subjected to quick processing can be finished with high quality in the same way as with the negative film 12 for standard processing.

Meanwhile, when an image recorded on the negative film 12 already subjected to development processing is reprinted, the negative film 12 is fed directly into the exposure device 20 from outside the machine without being passed through the film processor 14. This negative film 12 which is fed directly into the exposure device 20 passes over the reader 120, and is inserted into the negative carrier 46. By reading the bar code 118 recorded in a predetermined position on the negative film 12, the reader 120 is capable of determining whether or not the negative film 12 is the negative film 12A for quick processing subjected to quick processing.

Accordingly, even in the case of the negative film 12A for quick processing subjected to quick processing, if the information to that effect is recorded as the bar code 118, the negative film 12A for quick processing can be finished as a photographic print of appropriate image quality even when reprinting is effected. In addition, in a case where the negative film 12A for quick processing was processed by another quick processor, if the information to that effect is recorded in a predetermined position on the negative film 12A, it is possible to finish the photographic print with high quality by means of the photographic processor 10 of this embodiment.

In this embodiment, as described above, information on development is recorded directly on the negative film 12 requiring particular processing such as quick processing, and, in the exposure device 20, the development information is read and the exposure conditions are set. However, information on development may be read directly from the image recorded on the negative film 12A.

Hereafter, a description will be given of an example of the method of reading from the image recorded on the negative film 12A such as whether the negative film 12A for quick processing was subjected to quick processing.

When the negative film 12A for quick processing is subjected to development processing by the film processor 14, the negative film 12A for quick processing is immersed consecutively in a color developing solution, a bleach-fixing solution, and washing water in the same way as the negative film 12 for standard processing. For this reason, the processing solutions such as the color developing solution and the bleach-fixing solution mainly infiltrate from the Y dye forming layer 110, i.e., the outermost layer to effect processing. At this time, as described above, progress in the processing of the inner M and C dye forming layers 108 and 106 further lags behind progress in the processing of the outermost Y dye forming layer 110. This difference in progress in the processing of the dye forming layers 110, 108 and 106 is attributable to the soft gradation of the image which occurs when the photographic printing paper 16 is imagewise exposed and processed.

Figure 7A:
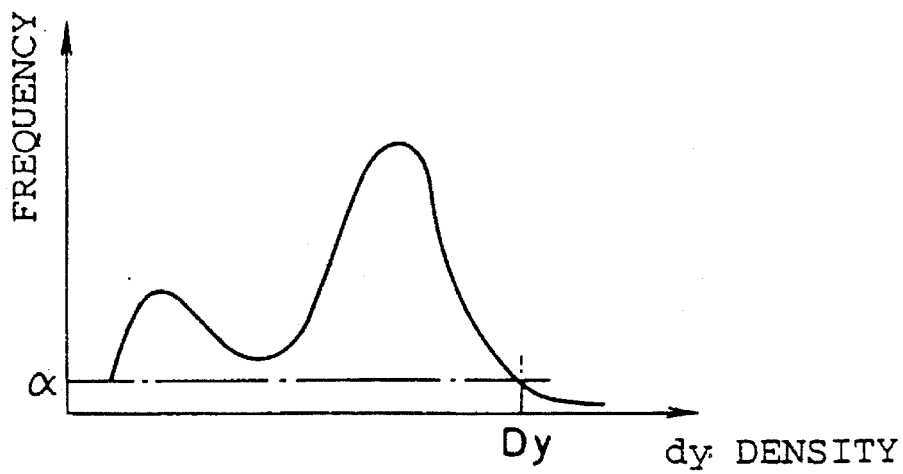
FIG. 7A is a diagram illustrating a density distribution of a Y dye forming layer as an example of the density distribution of each color dye forming layer of the negative film.
Figure 7B:
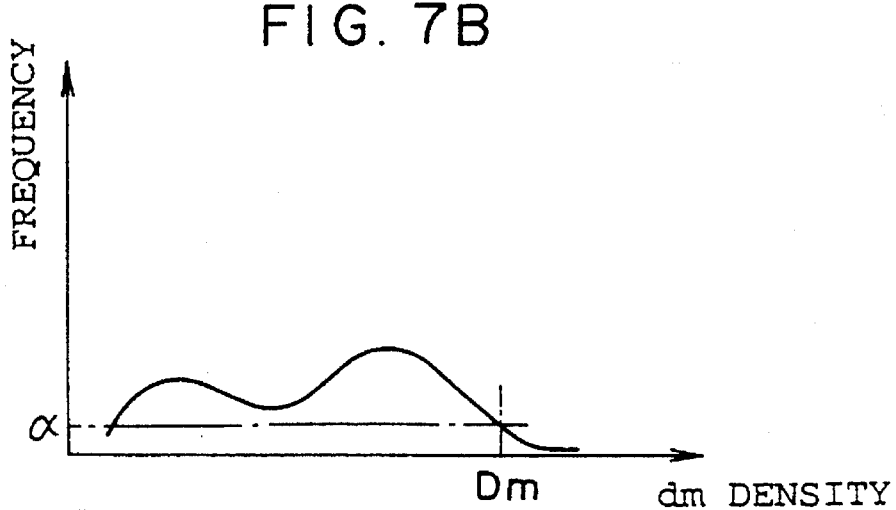
FIG. 7B is a diagram illustrating a density distribution of an M dye forming layer in the example of the density distribution of each color dye forming layer of the negative film.
Figure 7C:
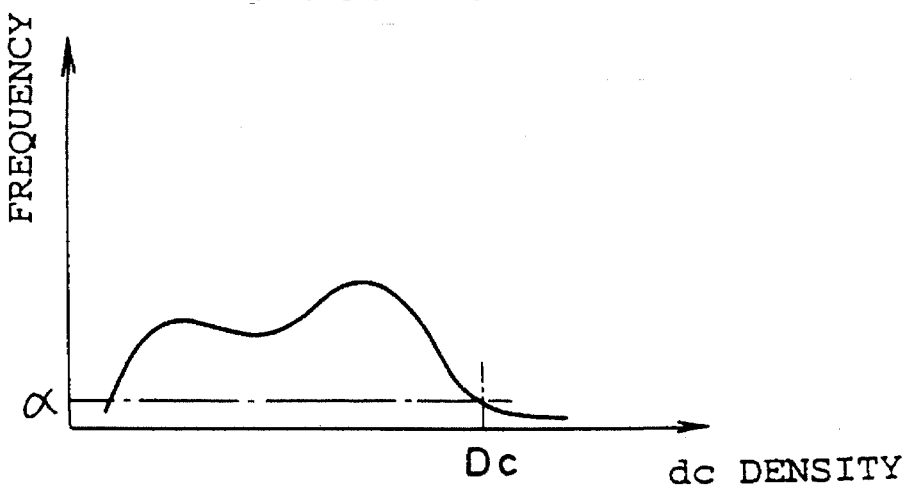
FIG. 7C is a diagram illustrating a density distribution of a C dye forming layer in the example of the density distribution of each color dye forming layer of the negative film.

Here, in the exposure controlling circuit 86 of the exposure device 20, the frequency for each density dc (C dye forming layer 106), dm (M dye forming layer 108), and dy (Y dye forming layer 110) for each color of the image recorded on the negative film 12 is measured by the sensor 84 prior to exposure. An example of the measured results is shown in FIGS. 7A to 7C. Here, a comparison is made among maximum densities Dc, Dm, and Dy in densities above a predetermined frequency $\alpha$ for each color.

As a method of this comparison, it is possible to use the difference in density between adjacent ones of the dye forming layers 106 to 110, or a ratio of densities thereof.

Figure 8:
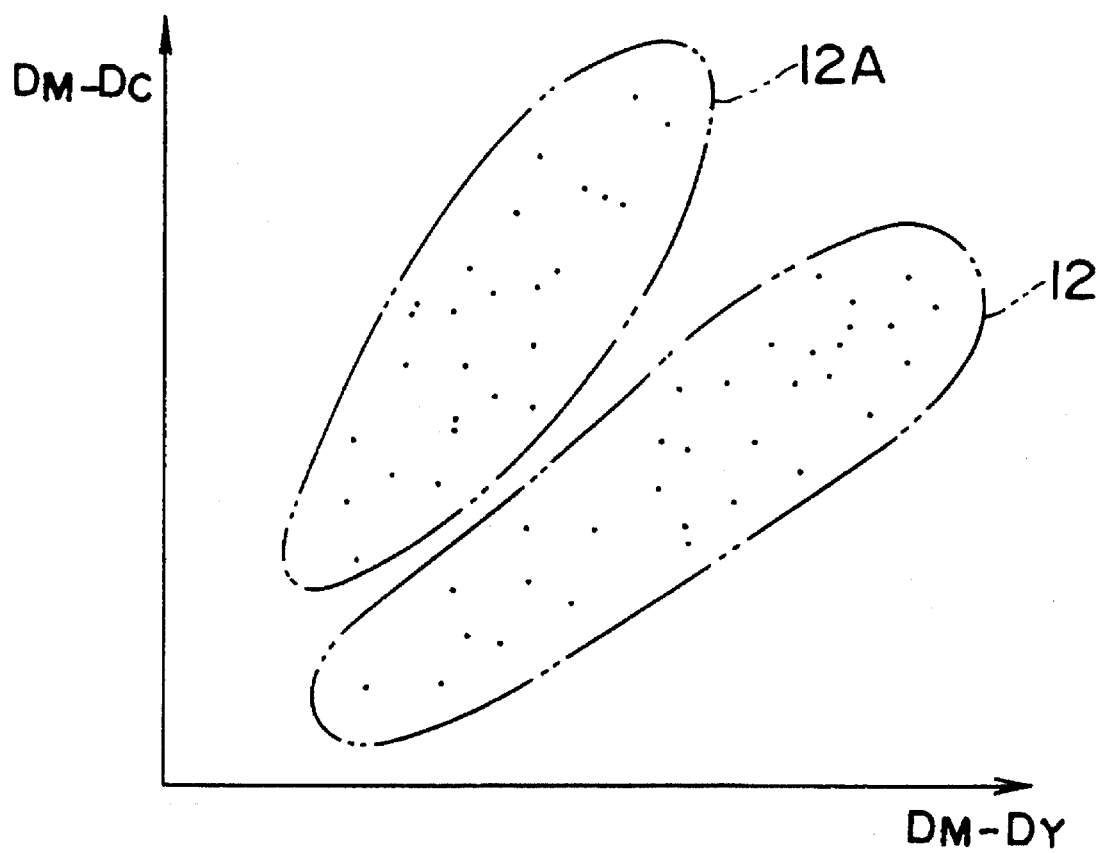
FIG. 8 is a graph illustrating the distribution of a density difference between adjacent ones of dye forming layers.

FIG. 8 shows a state of distribution of the density difference (or density ratio) Dy–Dm between the maximum density Dy of the outermost Y dye forming layer 110 and the maximum density My of the intermediate M dye forming layer 108 on the one hand, and the density difference (or density ratio) Dm–Dc between the M dye forming layer 108 and the lowermost C dye forming layer 106 on the other.

The ordinary negative film 12 has a tendency that the density difference Dy–Dm and the density difference Dm–Dc are substantially equal, or the density difference Dy–Dm becomes slightly larger. On the other hand, as compared with the negative film 12 for standard processing subjected to standard processing, the negative film 12A for quick processing subjected to quick processing shows a tendency that the density difference Dm–Dc becomes larger than the density difference Dy–Dm.

If density differences between adjacent ones of the dye forming layers 106–110 are compared and determined for a multiplicity of negative films 12 in each photographic processor 10, by comparing the density difference between adjacent ones of the color dye forming layers 106–110 of the negative film 12 fed into the exposure device 20, it is possible to easily determine whether the film is the negative film 12A for quick processing subjected go quick processing or the negative film 12 subjected to standard processing.

In the exposure controlling circuit 86, the exposure conditions are set on the basis of this determination to effect exposure processing. Consequently, an image having quality which is virtually unchanged from that obtained by processing the negative film 12 under the conditions of the ordinary processing solutions and the ordinary transport speed can be printed onto the photographic printing paper 16. Incidentally, when the densities dc, dm, and dy are measured for each color, the measurement may be made for each image frame. Alternatively, it is possible to conduct the measurement for all the images of one negative film 12 so as to determine whether or not the film is the negative film 12A. This permits a more reliable determination.

Further, if preset exposure conditions are selected on the basis of this determination, and exposure onto the photographic printing paper 16 is effected, whichever negative film 12 the image may be recorded on, an image of substantially fixed quality can be printed onto the photographic printing paper 16 regardless of the difference in tone due to the difference in processing conditions. In addition, if a determination is made from the density distribution of the image on the negative film 12 as to whether or not the film is the negative film 12A for quick processing subjected to quick processing, it is unnecessary to record on the negative film 12A the bar code 118 or the like specifying that the negative film for quick processing was subjected to quick processing. Also, it becomes possible to provide print processing with respect to negative films 12 and 12A processed by other film processors.

Although, in this embodiment, the bar code 118 is recorded by the recorder 116, an arrangement may be provided such that an optical wedge indicating the gradation of each color is recorded, and the gradation characteristic of the optical wedge is read by the sensor 84, so as to determine whether or not the film is the negative film 12A. In addition, the exposure conditions may be set in accordance with this gradation characteristic. Such a method for setting the exposure conditions by the optical wedge is effective in exposure devices such as digital exposure printers in which exposure is effected by the use of a laser beam.

Moreover, the photographic processor 10 used in this embodiment is not to be construed as limiting the arrangement of the present invention. As the photosensitive material processor in accordance with the present invention, it is possible to adopt an arrangement in which the exposure device and the second processing step are integrated, and the first processing step is provided separately. The present invention suffices if, when a first photosensitive material requiring particular processing is provided with ordinary development processing, those processing conditions are recorded on the first photosensitive material, and exposure conditions may be set by determining whether the first photosensitive material is a particular photosensitive material subjected to ordinary processing, on the basis of the exposure conditions recorded on the first photosensitive material in the exposure step or on the basis of the image recorded on the first photosensitive material.

Figure 10:
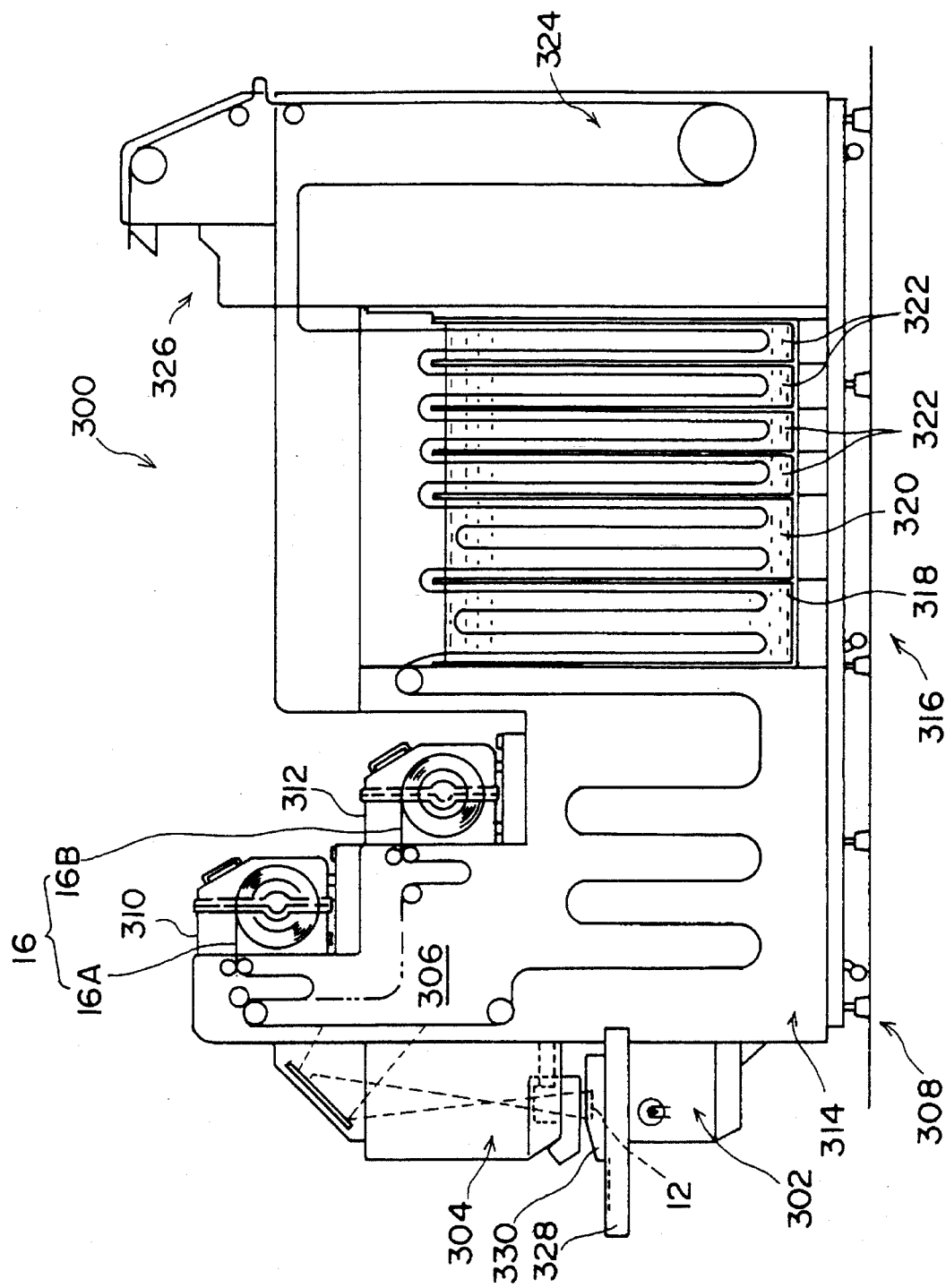
FIG. 10 is a schematic diagram illustrating a printer-processor used in a second embodiment of the present invention.

Next, a description will be given of a second embodiment of the present invention. FIG. 10 shows a printer-processor 300 constituting a part of a photosensitive processor. In this printer-processor 300, after the photographic printing paper 16 is exposed in accordance with an image recorded on the developed negative film 12, the photographic printing paper 16 is subjected to development processing. The printer-processor 300 has the exposure step and the second processing step of the first embodiment.

It should be noted that the negative film 12 used in this printer-processor 300 has been subjected in advance to development processing by an unillustrated processor. As the negative film 12, the following negative film is used: When the negative film 12 for either standard processing or quick processing is subjected to standard processing, an image of a substantially fixed gradation can be obtained, but if a negative film 12F for quick processing is subjected to quick processing, an image whose gradation (e.g., soft gradation) differs from a gradation obtained when subjected to standard processing is formed. At the time of development processing, whether the film is for standard processing or quick processing and whether standard processing was effected or quick processing was effected are recorded on the negative film 12 by means of the bar code 118 (see FIG. 2A) or the like.

This printer-processor 300 has a printer section 308 which is comprised of a light source unit 302, an optical system 304, and an exposure changer 306. In addition, a plurality of (for example, in this embodiment, two) paper magazines 310 and 312 are loaded in the exposure chamber 306. In the paper magazines 310 and 312, photographic printing papers 16A and 16B having different gradation characteristics are accommodated in roll form as the photographic printing papers 16.

As for these photographic printing papers 16A and 16B, one of them is selected, and is drawn into the exposure chamber 306. Light is emitted from the light source section 302, and the photographic printing paper 16A or 16B is exposed by the light which has passed through the optical system 304 and transmitted through the negative film 12, thereby effecting exposure in accordance with the image recorded on the negative film 12.

These photographic printing papers 16A and 16B have such gradation characteristics that, when the same image is exposed under the same exposure conditions and is developed, the image formed on the photographic printing paper 16B tends to exhibit a soft gradation as compared with the image formed on the photographic printing paper 16A. That is, the photographic printing papers 16A and 16B are so designed that the prints are finished with substantially the same gradation when an image, which was recorded on the negative film 12A for quick processing subjected to quick processing and was formed with a soft gradation, is exposed on the photographic printing paper 16B and when an image, which was recorded on the negative film 12 subjected to standard processing, is exposed on the photographic printing paper 16A.

A reservoir section 314 is provided below the exposure chamber 306. The photographic printing paper 16, on which the image recorded on the negative film 12 has been printed in the exposure chamber 306, passes through the reservoir section 314, and is transported to a processor section 316 provided adjacent thereto.

The processor section 316 is comprised of a color developing tank 318 in which a color developing solution is accommodated, a bleach-fixing section 320 in which a bleach-fixing solution is accommodated, and a plurality of rinsing tanks 322 in which cleaning water is accommodated. A drying section 324 is disposed downstream of the rinsing tank 322.

The photographic printing paper 16 transported to the processor section 316 is provided with color development, bleach-fixing, and clean processing. The photographic printing paper 16 is then transported to the drying section, and after it is subjected to dry processing, the photographic printing paper 16 is cut into pieces for each image frame, for instance. The cut pieces are discharged to outside the machine, and are consecutively accumulated as photographic prints by a sorter 326.

The negative film 12 to be processed by the printer-processor 300 is loaded on a negative carrier 330 disposed on an exposure table 328. The negative carrier 330 is provided with a bar code sensor 332 (see FIG. 11) for reading the bar code 118 recorded on the negative film 12.

As shown in FIG. 11, the bar code sensor 332 is connected to a printing-paper selecting circuit 334. When the bar code 118 recorded on the negative film 12 is read by the bar code sensor 332, the printing-paper selecting circuit 334 selects either photographic printing paper 16A or 16B, and operates either a printing-paper drawing-out section 336 serving as a transporting section for transporting the photographic printing paper 16A to the exposure chamber 306 or a printing-paper drawing-out section 338 serving as a transporting section for transporting the photographic printing paper 16B to the exposure chamber 306.

In the printer section 308, the photographic printing paper 16 is drawn out from one of the paper magazines 310 and 312 by one of the printing-paper drawing-out sections 336 and 338 operated by the printing-paper selecting circuit 334, and the exposure operation is started. It should be noted that the image recorded on the negative film 12 may be read by a CCD image sensor 400 instead of the bar code sensor 332 prior to exposure, and the gradation of the image recorded on the negative film 12 may be read from such as a mean value of the densities of the respective color components, so as to select the photographic printing paper 16 on the basis of this gradation.

Since the image recorded on the negative film 12A for quick processing subjected to quick processing exhibits a soft gradation as compared with the image recorded on the negative film 12 subjected to standard processing, this image is exposed on the photographic printing paper 16B having a characteristic of a soft-gradation tendency, whereby the image formed on the photographic printing paper 16B is formed with a gradation substantially equivalent to that Obtained when the image recorded on the negative film 12 subjected to standard processing is printed on the photographic printing paper 16A, without needing to change the exposure conditions. Namely, the image recorded on the negative film 12A for quick processing subjected to quick processing can be formed on the photographic printing paper 16 with a gradation similar to that of the negative film 12 subjected to standard processing, without substantially changing the exposure conditions.

Thus, detection is made as to whether the first photosensitive material is a standard photosensitive material or a particular photosensitive material and whether, if it is the particular photosensitive material, standard processing was provided or particular processing was provided, so as to estimate the gradation of the image recorded on the first photosensitive material. At least one of the exposure conditions and the second photosensitive material is changed to compensate the gradation difference. Accordingly, regardless of whether the first photosensitive material is a particular photosensitive material and, if it is the particular photosensitive material, whether particular processing was provided, an image of substantially fixed quality (gradation) can be formed on the second photosensitive material exposed and subjected to development processing.

In the same way as the photographic processor 10, the printer-processor 300 shows an example of the photosensitive material processor, and does not limit the arrangement of the photosensitive material processor. For example, it suffices if such a photosensitive material processor is capable of providing processing such that after an imagewise exposed first photosensitive material is subjected to development processing, a second photosensitive material on which the image is exposed can be subjected to development processing, and various combinations are possible. In addition, the negative film 12 and the photographic printing paper 16 do not limit the first and second photosensitive materials in accordance with the present invention. In the present invention, it suffices if either information, which was recorded at the time of processing the first photosensitive material in the first processor concerning whether the photosensitive material is a particular photosensitive material and whether particular processing was provided, or the image recorded on the first photosensitive material, is read; and if one of the exposure conditions and the second photosensitive material can be selected so that, irrespective of the state of the image on the first photosensitive material, an appropriate image can be recorded on the second photosensitive material when the image recorded on the first photosensitive material is exposed on the second photosensitive material.

What is claimed is:

1. A processing method in which after an exposed negative film is subjected to development processing in a first processing step, a print paper is subjected to exposure processing in an exposure step in accordance with the type of exposed negative film, comprising the steps of:

detecting in the first processing step whether the exposed negative film is of a first type or a second type of film;

if it is detected at least that the exposed negative film is of the first type of film, recording on the exposed negative film processing conditions in the first processing step;

setting exposure conditions in the exposure step in accordance with one of a result of the detection and the processing conditions recorded on the exposed negative film; and exposing the print paper under the set exposure conditions, wherein said first and second types of films require processing at different rates.

2. A method of processing a photosensitive material according to claim 1, wherein the detection is effected by reading one of information recorded in advance on the negative film and information recorded in advance on a magazine in which the negative film is accommodated.

3. A method of processing a photosensitive material according to claim 2, wherein the recording is effected when the information recorded in advance on the magazine in which the negative film is accommodated has been read.

4. A processing method in which a photographic paper is subjected to exposure processing in an exposure step in accordance with the type of imagewise exposed film subjected to development processing in a first processing step, comprising the steps of:

detecting in the exposure step whether the exposed film is of a first type or second type of film and whether the exposed film has been subjected to quick processing, on the basis of one of information recorded on the exposed film and the image recorded on the exposed film;

selecting one of a plurality of photographic papers respectively having different gradation characteristics, on the basis of a result of the detection; and exposing the image on the selected photographic paper on the basis of the result of the detection, wherein said second type of film has a processing rate which is slower than said first type of film.

5. A method of processing a photosensitive material according to claim 4, further comprising the step of:

transporting the selected photographic paper to a position of exposure processing.

* * * * *